United States Patent [19]

Saponaro

[11] 3,876,399

[45] Apr. 8, 1975

[54] ELIMINATOR SECTION FOR SPRAY BOOTHS

[76] Inventor: Joseph P. Saponaro, 13823 W. Eight Mile Rd., Franklin, Mich. 48235

[22] Filed: May 8, 1974

[21] Appl. No.: 468,216

[52] U.S. Cl.............. 55/228; 98/115 SB; 261/112
[51] Int. Cl............................................ B01d 47/12
[58] Field of Search .......... 55/93, 94, 228; 261/112; 98/115 SB

[56] References Cited
UNITED STATES PATENTS

| | | | |
|---|---|---|---|
| 3,018,847 | 1/1962 | Stanly | 261/112 X |
| 3,168,030 | 2/1965 | Wilhelmsson et al | 261/112 X |
| 3,390,400 | 6/1968 | Dock | 261/112 X |
| 3,516,230 | 6/1970 | Saubesty | 55/228 |
| 3,795,093 | 3/1974 | Gerhard et al | 261/112 X |

*Primary Examiner*—Charles N. Hart
*Assistant Examiner*—Ethel R. Cross
*Attorney, Agent, or Firm*—Cullen, Settle, Sloman & Cantor

[57] ABSTRACT

A particle eliminator section for a compartment adapted to receive a mixture of air and particles or contaminants. Said compartment overlies a water tank and has an exhaust stack. Said eliminator section includes an elongated laterally extending housing between the base of the compartment and said stack. An elongated transversely arcuate bottom wall for said housing extends across the bottom of said stack and is included downwardly and inwardly with its inner end in registry with the fluid level in said tank for delivering water thereinto. Said housing has a longitudinally extending inlet for the height of the housing which communicates with said compartment adjacent the tank water line. An outlet for said housing communicates with said stack. An elongated bucket of U shape in cross section extends lengthwise of the housing and is suspended in said housing throughout its length. The apex of the bucket along its length defines with said bottom wall a throated venturi for the passage of high velocity air through said housing to said stack. A water supply to said bucket keeps it overflowing along its top edges to provide a pair of spaced continuous water cascades along its length dropping onto said bottom wall. The mixture of air and particles drawn into said stack by a suction device therein, impinges upon said cascades scrubbing out and separating the suspended particles for washing down into said tank, the remaining clean air exhausting up through said stack to atmosphere.

19 Claims, 7 Drawing Figures

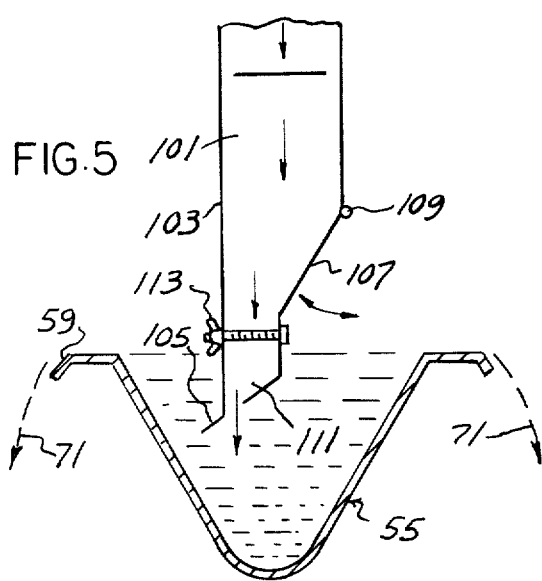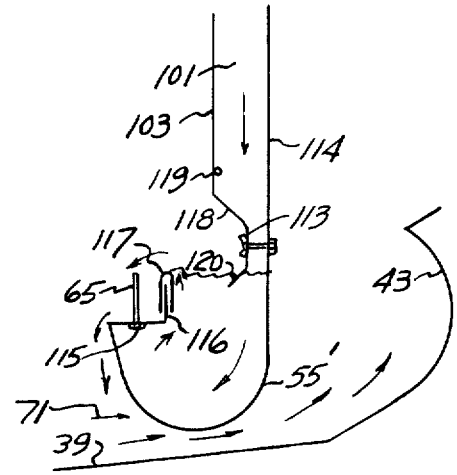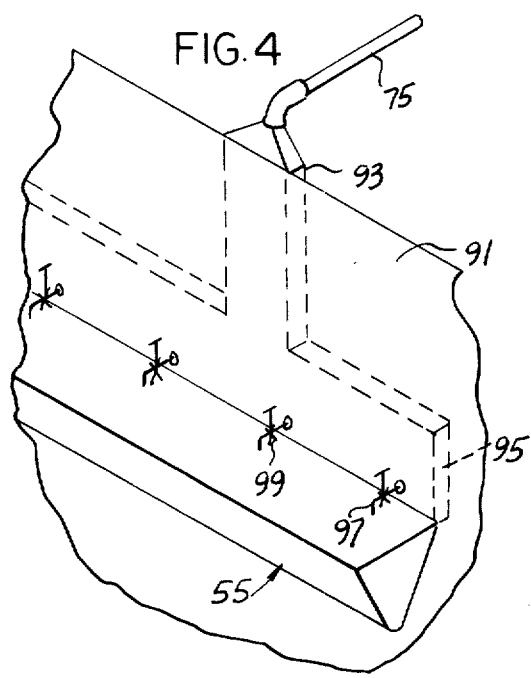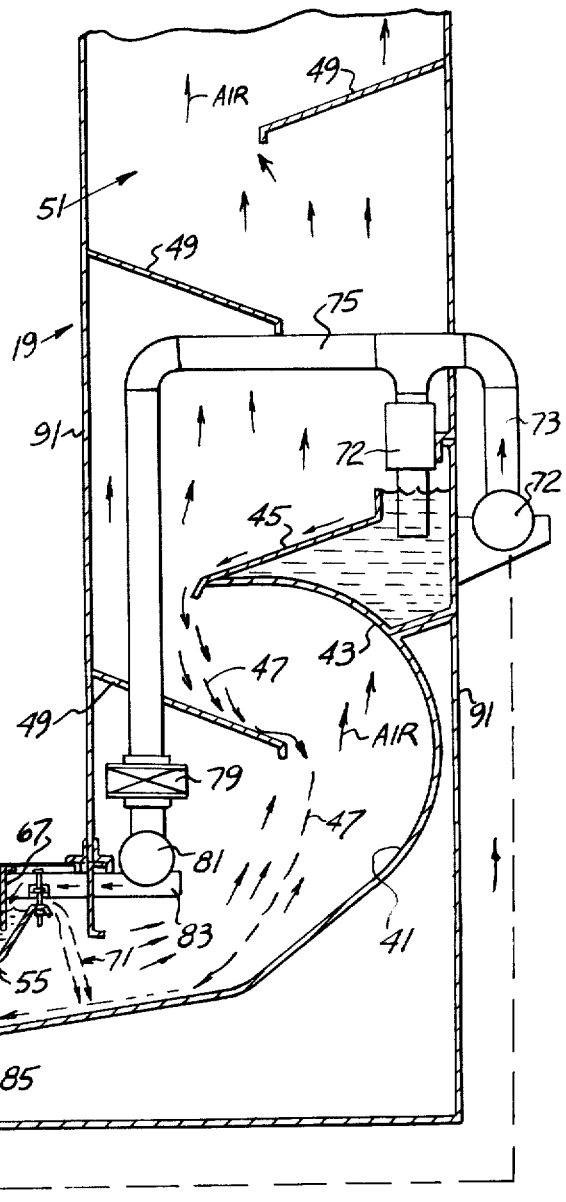

3,876,399

ELIMINATOR SECTION FOR SPRAY BOOTHS

BACKGROUND OF THE INVENTION

Heretofore, spray booths included a compartment with a tank at the bottom and side walls with outlets to one or more exhaust stacks. There has accumulated in the compartment particles of paint or other particles which are suspended in the moving air and move with the exhausted air up the stack. The problem has been the elimination of these particles from the air before exhausting to atmosphere.

Factories have chambers which accumulate dust and particles from machining operations which must be exhausted, with the particles filtered out first. In devices of this nature, there have been paint and particle eliminators known which are partly effective so that the air escaping to atmosphere contains particles, 11 to 20 parts per million.

It has been found necessary for ecology reasons and to prevent contamination of the atmosphere that there be a reduction to three parts particles per million passing through the stacks.

BRIEF DESCRIPTION OF THE INVENTION

It is an object of the present invention to provide an improved eliminator section for a spray booth or other compartment which is capable of cleaning the exhaust air and removing particles therefrom so that not more than three parts per million or less particles pass therethrough.

It is another object to provide an improved eliminator section for a spray booth which includes an elongated housing having a bottom wall which is arcuate and is inclined downwardly and inwardly from the stack. A bucket of U shape is suspended from the housing so that its apex defines with said bottom wall a throated venturi for the high velocity passage of air through said housing into said stack. Continuous water cascades from the top edges of the bucket provide a pair of cascading curtains for impinging upon and scrubbing the air for the separation of particles therefrom for washing down into the tank.

These and other objects will be seen from the following specification and claims in conjunction with the appended drawings in which:

THE DRAWINGS

FIG. 2 is a fragmentary vertical section of one side of such spray booth illustrating the improved eliminator section in conjunction with one exhaust stack.

FIG. 4 is a schematic view illustrating one method of delivery of washing water to the bucket along its length.

FIG. 5 is a fragmentary vertical section of another method of water delivery.

FIG. 6 is a view similar to FIG. 5 showing a modification.

It will be understood that the above drawings illustrate merely a preferred embodiment of the invention, and that other embodiments are contemplated within the scope of the claims hereafter set forth.

DETAILED DESCRIPTION OF THE INVENTION

Figure 1:
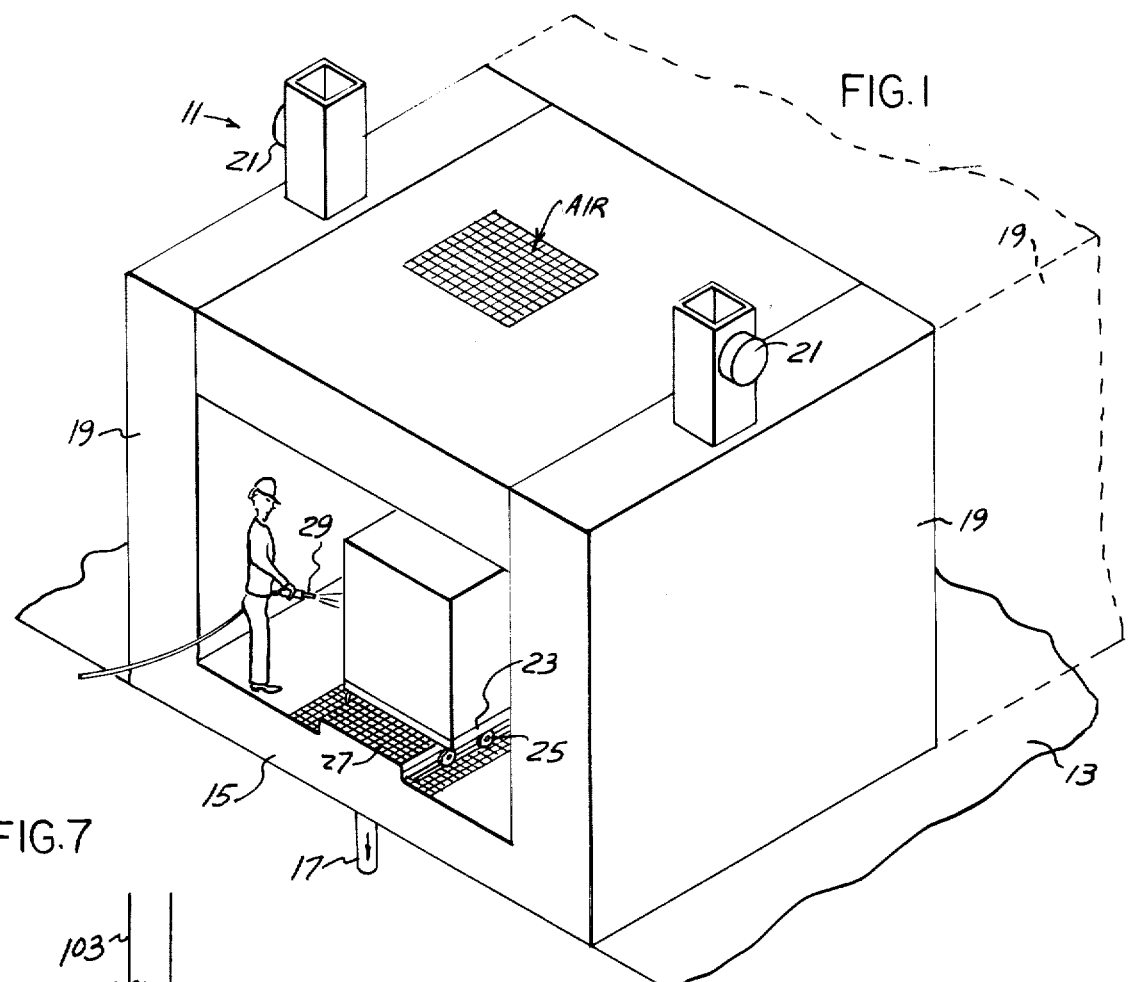
FIG. 1 is a fragmentary schematic view of the present spray booth with eliminator sections.

Referring to the drawings, FIG. 1 shows schematically the complete assembly of the spray booth 11 of which the present invention is a part. Said spray booth is mounted upon a floor 13 and has a base mounting a water tank 15 with a suitable drain, fragmentarily shown at 17. The respective side walls of the booth throughout its length define a series of laterally arranged eliminator sections 19, each including a stack with high capacity exhaust fan 21 adjacent the top thereof for exhausting to atmosphere.

A conventional type of dolly 23 is adapted to support a suitable work, such as a vehicle or other construction for movement upon and along the conveyor 25, which is spaced above said tank, and above the horizontally disposed grating 27.

The booth normally has one or more workers holding spray guns as schematically shown at 29 for application to the object. The over spray of pain mixed with incoming air is drawn into the exhaust housing to the stack. Particularly with spray booths, local laws require that there by sufficient flow of fresh air thereinto as to protect the workers against inhalation of paint particles or other contaminants.

CONVENTIONAL OPERATION

In operation, the tank will assume a water level, as designated at 32, and floating thereon will be a layer of particles, such as paint particles 33. As shown in FIG. 2, there will be a suitable skimmer 35 which projects through some portion of the tank for skimming off the accumulated layer of paint or other particles floating upon the body of water.

Said booth has a suitable framework 37 which partly supports the upright stack, forming a part of the eliminator section 19 which includes the opposed side walls 91, FIG. 2. Formed within the framework 37 and interposed between the tank and the stack is a housing 38, FIG. 2, which includes the downwardly and inwardly inclined bottom wall 39. This wall extends into the stack and merges with the arcuate downwardly and inwardly inclined wall 41 which merges with the downwardly and outwardly inclined wall 43, forming a part of the water overflow tank 45, of the conventional construction.

The water flowing into said tank and overflowing therefrom, passes over its top longitudinal surface and laterally outward and over the lip, providing a continuously flowing elongated water cascade 47. This impinges upon one of a series of alternated and staggered baffles 49 within the stack and drops down onto the bottom wall elements 39 and 41 for movement down into tank 15. Upwardly moving air impinges upon the water curtain for separating and washing down particles therefrom. However, too many particles escape to atmosphere.

The present stack defines an air exhaust chamber 51 for upwardly moving air. Most of the foregoing description is background and represents conventional construction in spray booths of this type.

ELIMINATOR SECTION

The present invention is primarily directed to the mechanism within the housing 38 which provides a means for a very effective separation of particles including paint particles from the air before it is exhausted through the stack to atmosphere.

For this purpose and for each of the eliminator sections 19, of which there may be a number edge to edge, forming the side wall of the booth, there is provided an elongated bucket 55 of general U-shape in cross section which is supported within housing 38 and suspended therefrom, FIG. 2.

Figure 3:
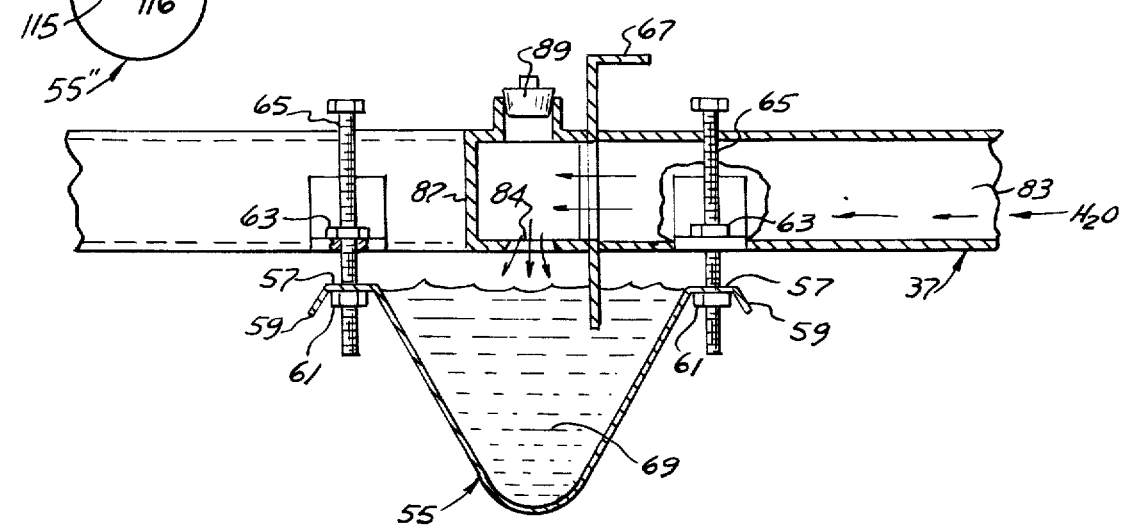
FIG. 3 is a vertical section on an increased scale showing the mounting of the bucket upon the framework and within the air outlet housing communicating with the stack.

As shown in FIG. 3, said bucket includes a pair of outwardly extending lateral flanges 57 which terminate in the downwardly and outwardly inclined lips 59.

To provide an adjustable mounting for said bucket along its length, there are provided a series of nuts 61 secured to the underside of the respective flanges 57 along the length of the bucket. With additional nuts 63 secured to the framework 37, there are provided a series of adjustable support bolts 65 which extend threadedly through the respective nuts 63 and 61 and provide a means for regulating the vertical height of the bucket within said housing.

The primary purpose of this is to define with the longitudinal lower edge portion of the bucket with respect to the bottom wall 39, a throated venturi 85 opening of elongated rectangular shape facing the tank.

An elongated upright plate 67 functions as an air stop, depending from the framework with its lower longitudinal edge projected down into the continuously moving accumulated water 69 within the bucket 55, FIGS. 2 and 3. Since the plate 67 extends to the top of the housing, it provides a barrier to prevent the passage of air through the housing.

With the bucket 55 of which there will be a series, end to end for each of the respective eliminators, there will be a constant flow of water thereinto keeping the bucket full and overflowing, to thus define over the longitudinal sides thereof a pair of continuous overflow water cascades 71 which serve as barriers within the housing to meet the oncoming flow of air passing through housing 38 and exhausting upwardly through the stack, FIG. 2.

A suitable pump 72 withdraws water from the tank drain 17 and delivers it under pressure as at 73 to the conduit 75, a branch of which at 72 provides continuous water flow to overflow tank 45. Said conduit has a downwardly extending portion within said stack which merges with the supply header 81 which extends longitudinally of the side wall of the stack and has a series of delivery pipes 83 which extend laterally inward, delivering water down into the bucket, keeping the same full and overflowing.

A schematic illustration of this is shown in FIG. 4, wherein the conduit 75 joins the gutter 93 upon the interior of the side wall of the stack. Said gutter terminates in the water header 95. A series of parallel laterally and inwardly extending conduits 97 terminate in spouts, delivering fluid down into said bucket with suitable valves 99 interposed for regulating flow.

It is the vertical spacing of the apex of the bucket 55 with respect to the housing bottom wall 39 which defines a venturi 85 of reduced cross sectional area across the full length of the housing 38 and through which must pass all of the upwardly drawn air and particles admixed therewith.

In spray painting, initially all of the particles are suspended in the air, moving through the compartment and out the stacks. The present eliminator sections provide a means of mechanically separating, washing and scrubbing out from the exhausting air substantially all of these particles as they impinge upon and pass through the parallel spaced continuous water cascades 71, FIG. 2. The materials removed from the flowing air drop down onto the downwardly and inwardly inclined bottom wall 39 and are washed into the tank, floating as at 33, for skimming and removal.

It is the high speed movement of the air as it impinges upon the pair of cascades 71 which causes a mechanical removal, filtering and scrubbing action of the air in such a manner as to drop out therefrom substantially all of the particles or paint particles which have accumulated or are in suspension in the moving blast of air.

In the eliminator section the air flow is in the range of 750–1,350 cubic feet per minute per linear foot of housing.

The air is moving through housing 38 at a velocity of approximately 5,000 feet per minute. This could range between 4,000 and 10,000 feet per minute. This increased velocity is determined by the venturi 85 since, the larger body of air moving into the housing is restricted so as to flow under the apex of the bucket 55 which extends longitudinally for the length of said housing 38.

In the present construction, the exhausting air to atmosphere has approximately three particles per million. In an efficient operation of the present eliminator section and the in air flow through the stack, this can be as low as 0.5 parts per million.

In the event a greater efficiency is desired or if the problem of separation of particles including paint particles is severe, an additional bucket 55 may be employed, such as shown in dash lines in FIG. 2, to double up on the cleaning and scrubbing action, and thus providing additional cascades of water through which the moving air and particles must pass.

Referring to FIG. 3, clean out housings 87 forming a part of the framework 37 are arranged directly above bucket 55 and include a series of openings with removable plugs 89 to provide access to the outlets 84 and the interior of the bucket for clean out purposes.

In a heavy duty booth there is a water flow 35 gallons per minute per linear foot of booth. This can be as low as 24 gallons. Other devices use up to 45 gallons per minute. More power is used for the exhaust fans, maintaining a stack pressure of 6 to 7 inches. The present eliminator section operates on 5 and ½ inches stack pressure, since it uses less water.

In the modification shown in FIG. 5, bucket 55 is located directly below the water conduit 101. One wall 103 may be a continuation of the stack wall extending down into said bucket as at 105. Wall 103, therefore, further functions as an air stop similar to air stop 67, FIG. 2. Said conduit has a converging wall element 107 hinged at 109 to facilitate clean out. Wall element 107 terminates within said bucket providing water inlet 111. The lateral dimension of said inlet 111 may be regulated by the adjusting screws 113.

FIG. 6 shows a modification of the water supply source of FIG. 5 with a water conduit 101 similar to conduit 93 of FIG. 4. The outer wall 103 of said conduit coincides with wall 91 of the stack. The inner wall 114 of said conduit at its lower end terminates in the elongated bucket 55'. The far side of said bucket has a water stop 115 which terminates in the upstanding flange 116. Along said flange is a U-shaped lip 117 which is vertically adjustable on said flange for regulating the overflow of liquid from the interior of the bucket 55'. This flows over said adjustable lip forming cascade 71 which impinges upon bottom wall 39 as above described with respect to FIG. 2.

Conduit wall 103 has at its lower end a clean out plate 118 hinged thereto at 119. Said plate terminates in the adjustable water outlet 120 regulated by a series of wing nut and screw assemblies 113. The free longitudinal stop or flange 115 of bucket 55' is supported by a series of bolts 65 in the same manner as above described with respect to FIG. 3.

Figure 7:
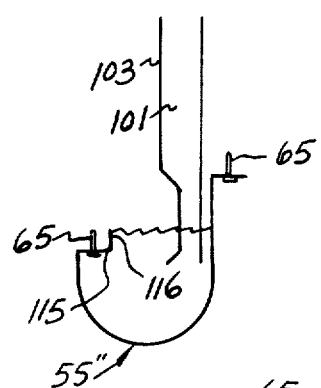
FIG. 7 is a similar view of another modification.

A slight variation is shown in FIG. 7 wherein the bucket 55" is vertically adjustable relative to the conduit 101 and thus includes a second flange 57 adjustably supported by a series of similar bolts 65. In this modification conduit 101 extends down into the top of said bucket adjacent one side thereof.

Having described my invention, reference should now be had to the following claims.

I claim:

1. In a compartment adapted to receive a mixture of air and particles or contaminants, an elongated base, a water and particle collection tank thereon, one or more longitudinal side walls of said compartments defining a plurality of particle eliminators; each eliminator having an upright stack; an air exhaust means at the upper end thereof for drawing air through said compartment; a series of longitudinally spaced and staggered baffles in said stack; a primary water overflow tank in said stack cascading water downwardly over at least one baffle; and an arcuate scroll-shaped bottom wall in said stack inclined inwardly and downwardly in registry with the water level in said tank for delivering water thereinto;

the improvement in said eliminator comprising a laterally-extending housing between said compartment and stack having an elongated air chamber with an inlet to the interior of said compartment adjacent the water line in said tank and in registry with said bottom wall, said bottom wall extending through said housing, and an outlet to said stack;

an elongated bucket of U-shape in cross section extending lengthwise of and suspended in said chamber for the length of said housing;

and a water supply pipe connected to a source, outletting into said bucket providing a pair of spaced continuous water cascades over the opposite longitudinal side edges of said bucket falling onto said bottom wall;

the mixture of air and paint or particles impinging upon said cascades scrubbing out and separating the suspended particles for washing down into said tank, the remaining clean air exhausting through said stack to atmosphere.

2. In the eliminator section of claim 1, the accumulated particles in said tank floating upon the water therein; and a skimmer in said tank extending into the layer of particles for continuous removal thereof from said tank.

3. In the elminator section of claim 1, an upright longitudinal air stop plate depending from the top of said housing with its longitudinal bottom edge emmersed in the water in said bucket for its full length for blocking the passage of air thereover.

4. In the eliminator section of claim 1, a framework spaced above said base along its length; said bucket having at its top edges a pair of elongated out-turned flanges terminating in longitudinally extending downwardly inclined lips; to provide continuous curtains of cascading water from said bucket; and a series of fasteners depending from said framework and adjustably secured to and along the length of said flanges for regulating the vertical height of said bucket relative to said bottom wall and the venturi defined therewith.

5. In the eliminator section of claim 1, said water supply being connected to said primary water overflow tank, delivery of water to said bucket including a conduit within said stack connected to said water supply; a longitudinally disposed water header above and extending along the length of said bucket; and a series of longitudinally spaced branch pipes connected to said header and outletting into said bucket along its length.

6. In the eliminator section of claim 1, said tank having a drain outlet, said water supply pipe being connected to said drain outlet; and a pump connected into said water supply pipe.

7. In the eliminator section of claim 5, and an adjustable water control valve on each of said branch pipes.

8. In the eliminator section of claim 1, said air flow being in the range of 750 to 1,350 cubic feet per minute per linear foot of housing.

9. In the eliminator section of claim 1, the water flow to said bucket being in the range of 24 to 35 gallons per minute per linear foot of said housing.

10. In the eliminator section of claim 1, said water supply pipe including a first wall extending down into said bucket along its length, defining an air stop constraining all air moving through said housing to pass under said bucket; a second wall terminating above said bucket; an outlet section depending from and hinged to said second wall converging towards said first wall defining a water outlet into said bucket.

11. In the eliminator section of claim 10, an adjustable screw means between the lower ends of said wall and outlet section for regulating the width of said water outlet.

12. In the eliminator section of claim 10, said first wall being a continuation of one wall of said stack.

13. In a spray booth having an elongated base, a water and particle collection tank thereon and one or more longitudinal side walls defining a series of longitudinal particle eliminators, each eliminator having an elongated upright stack and air exhaust means in said stack; said stack having a scroll-shaped arcuate bottom wall inclined inwardly and downwardly in registry with the water level in said tank for delivering water and particles to said tank;

the improvement in said eliminator which comprises a laterally extending housing having an elongated air chamber with an inlet to the interior of said booth adjacent and above the water level in said tank and in registry with said bottom wall, and an outlet to said stack;

an elongated bucket of general U-shape in cross section extending lengthwise of and suspended in said chamber for the length of said housing;

the apex of the bucket along its length defining with said bottom wall a throated venturi for the passage of high velocity air into said stack;

and a water supply pipe connected to a source outletting into said bucket, providing a pair of spaced continuous water cascades over the opposed side edges of said bucket, falling upon said bottom wall, the mixture of air and particles impinging upon said cascades scrubbing out and removing the suspended particles for washing down into said tank, the remaining clean air exhausting through said stack to atmosphere.

14. In the eliminator section of claim 13, said air flow being in the range of 750 to 1,350 cubic feet per minute per linear foot of housing.

15. In a spray booth having an elongated base, a water and particle collection tank thereon, a longitudinal grating overlying the tank and a longitudinal converyor for moving objects therethrough, one or more side walls of said booth defining longitudinal particle eliminators, each eliminator having an upright stack; an air exhaust means at the upper end thereof for drawing air through said booth; a series of longitudinally spaced and staggered baffles in said stack; a primary water overflow tank in said stack cascading water downwardly over at least one baffle; and an arcuate bottom wall inclined inwardly and downwardly over at least one baffle; and an arcuate bottom wall inclined inwardly and downwardly in registry with the water lever in said tank for delivering water thereinto;

the improvement in said eliminator comprising a laterally extending housing having an elongated air chamber having an inlet to said booth adjacent the water line in said tank and in registry with said bottom wall, and an outlet to said stack;

an elongated bucket of general U shape in cross section extending lengthwise of and suspended in said chamber for the length of said housing;

the apex of the bucket along its length defining with said bottom wall a throated venturi for the passage of high velocity air therethrough and into said stack;

an air stop plate depending from the top of said housing into said bucket emmersed in the water therein;

and a water supply connected to a source, outletting into said bucket providing a pair of spaced continuous water cascades over the opposite longitudinal side edges of said bucket falling onto said bottom wall;

the mixture of air and paint or particles impinging upon said cascades scrubbing out and separating the suspended particles for washing down into said tank, the remaining clean air exhausting through said stack to atmosphere.

16. In combination, a water tank;

a compartment above said tank adapted to accumulate dust and particles and contaminants for exhausting;

a stack on one side of said compartment having a power exhaust means;

a scroll-shaped bottom wall for said stack inclining downwardly and inwardly and terminating at the water line in said tank;

an outlet opening in one wall of said stack providing an air passage;

an elongated bucket of U-shape in cross section suspended in said opening for the length thereof; the apex of said bucket along its length defining with said bottom wall a throated venturi for the passage of high velocity air therethrough into said stack;

said stack wall extending into said bucket along the length thereof defining an air barrier, constraining all exhaust air to flow below said bucket;

and a continuous water supply connected to said bucket providing a pair of spaced continuous water cascades over the opposite longitudinal side edges thereof falling onto said bottom wall, the mixture of air and particles inpinging upon said cascades scrubbing out and separating the suspended particles for washing down into said tank, the remaining clean air exhausting through said stack to atmosphere.

17. In a spray booth having an elongated base, a water and particle collection tank thereon and one or more longitudinal side walls defining a series of longitudinal particle eliminators, each eliminator having an elongated upright stack and air exhaust means in said stack; said stack having a scroll-shaped arcuate bottom wall inclined inwardly and downwardly in registry with the water level in said tank for delivering water and particles to said tank;

the improvement in said eliminator which comprises a laterally extending housing having an elongated air chamber with an inlet to the interior of said booth adjacent and above the water level in said tank and in registry with said bottom wall, and an outlet to said stack;

an elongated bucket of general U-shape in cross section extending lengthwise of and suspended in said chamber for the length of said housing;

the apex of the bucket along its length defining with said bottom wall a throated venturi for the passage of high velocity air into said stack;

and a water supply pipe connected to a source outletting into said bucket; said water supply pipe including a first wall extending down and merging with one side of said bucket along its length, said first wall defining an air stop constraining all moving air through said housing to pass under said bucket; a second wall as a continuation of the stack wall terminating above said bucket; an outlet section depending from and hinged to said second wall converging towards said first wall defining a water outlet into said bucket; providing a continuous water cascade over the free side edge of said bucket, falling upon said bottom wall, the mixture of air and particles impinging upon said cascade scrubbing out and removing the suspended particles for washing down into said tank, the remaining clean air exhausting through said stack to atmosphere.

18. In the spray booth of claim 17, an adjustable screw means between the lower ends of said wall and outlet section for regulating the width of said water outlet.

19. In the spray booth of claim 17, the connection between said first wall and bucket being separable, to permit vertical adjustment of said bucket with respect to said conduit and bottom wall.

* * * * *